(12) United States Patent
Hsiao et al.

(10) Patent No.: US 9,787,995 B2
(45) Date of Patent: Oct. 10, 2017

(54) SOURCE DRIVER, DRIVING CIRCUIT AND DISPLAY APPARATUS

(71) Applicant: Novatek Microelectronics Corp., Hsinchu (TW)

(72) Inventors: Chu-Ya Hsiao, Hsinchu (TW); Han-Ying Chang, Hsinchu (TW)

(73) Assignee: Novatek Microelectronics Corp., Hsinchu (TW)

( * ) Notice: Subject to any disclaimer, the term of this patent is extended or adjusted under 35 U.S.C. 154(b) by 65 days.

(21) Appl. No.: 14/533,097

(22) Filed: Nov. 5, 2014

(65) Prior Publication Data

US 2015/0325184 A1 Nov. 12, 2015

Related U.S. Application Data

(60) Provisional application No. 61/989,477, filed on May 6, 2014.

(30) Foreign Application Priority Data

Sep. 10, 2014 (TW) .............................. 103131185 A

(51) Int. Cl.
*G09G 3/36* (2006.01)
*H04N 19/176* (2014.01)
(Continued)

(52) U.S. Cl.
CPC ......... *H04N 19/176* (2014.11); *G09G 3/3611* (2013.01); *G09G 3/3688* (2013.01);
(Continued)

(58) Field of Classification Search
CPC ..... G09G 2300/0426; G09G 2310/027; G09G 2310/0297; G09G 2370/08; G09G 3/3611;
(Continued)

(56) References Cited

U.S. PATENT DOCUMENTS 6,690,367 B2 2/2004 Akimoto
7,110,009 B2 9/2006 Ooishi et al.
(Continued)

FOREIGN PATENT DOCUMENTS

CN 101923824 12/2010
CN 101996599 3/2011
(Continued)

OTHER PUBLICATIONS

"Office Action of Taiwan Counterpart Application", issued on Apr. 11, 2016, p. 1-8.
(Continued)

*Primary Examiner* — Tony Davis
(74) *Attorney, Agent, or Firm* — Jianq Chyun IP Office

(57) ABSTRACT

A source driver, a driving circuit using the same and a display apparatus using the same are provided. The display apparatus includes a display panel, a timing controller and a source driver. The timing controller is configured to receive an external image signal to provide a compressed image signal. The source driver is configured to receive the compressed image signal, and has a decompressor configured to convert the compressed image signal into restored image data and provide a plurality of source driving signals to drive the display panel according to a plurality of display data of the restored image data.

10 Claims, 6 Drawing Sheets

(51) Int. Cl.
*H04N 19/30* (2014.01)
*H04N 19/63* (2014.01)

(52) U.S. Cl.
CPC ............. *H04N 19/30* (2014.11); *H04N 19/63* (2014.11); *G09G 2300/0426* (2013.01); *G09G 2310/027* (2013.01); *G09G 2310/0297* (2013.01); *G09G 2340/02* (2013.01); *G09G 2370/08* (2013.01)

(58) Field of Classification Search
CPC ...... G09G 3/3688; H04N 19/17; H04N 19/30; H04N 19/63
USPC ....................... 345/204, 92, 94, 99
See application file for complete search history.

(56) References Cited

U.S. PATENT DOCUMENTS

| | | |
|---|---|---|
| 8,605,067 B2 | 12/2013 | Chen et al. |
| 8,638,285 B2 | 1/2014 | Nose et al. |
| 8,674,924 B2 | 3/2014 | Nose |
| 8,717,349 B2 | 5/2014 | Tsai et al. |
| 8,917,266 B2 | 12/2014 | Park et al. |
| 9,071,838 B2 | 6/2015 | Cho et al. |
| 2002/0186183 A1 | 12/2002 | Akimoto |
| 2004/0057322 A1* | 3/2004 | Kim ............. G11C 7/1051 365/230.06 |
| 2004/0169632 A1* | 9/2004 | Hosaka ............ G09G 3/3655 345/98 |
| 2004/0263540 A1 | 12/2004 | Ooishi et al. |
| 2004/0268016 A1* | 12/2004 | Lee .............. G11C 7/1066 711/1 |
| 2005/0212788 A1* | 9/2005 | Fukuda ............ G09G 3/20 345/204 |
| 2007/0140014 A1 | 6/2007 | Kwon et al. |
| 2010/0225620 A1* | 9/2010 | Lee .............. G09G 3/20 345/204 |
| 2010/0315406 A1* | 12/2010 | Nose ............. G09G 3/20 345/212 |
| 2011/0032235 A1 | 2/2011 | Nose |
| 2011/0050677 A1 | 3/2011 | Tsai et al. |
| 2012/0120043 A1 | 5/2012 | Cho et al. |
| 2012/0154358 A1 | 6/2012 | Chen et al. |
| 2012/0200483 A1 | 8/2012 | Moon et al. |
| 2012/0299974 A1 | 11/2012 | Park et al. |
| 2013/0120349 A1* | 5/2013 | Oh ............ G09G 3/3685 345/212 |
| 2014/0022221 A1* | 1/2014 | Furihata ............ G09G 3/003 345/204 |
| 2014/0098893 A1* | 4/2014 | Ju ............. H04N 19/127 375/240.26 |
| 2014/0104249 A1* | 4/2014 | Furihata ............ G09G 3/3674 345/204 |
| 2014/0285505 A1* | 9/2014 | Nakanishi ............ G06T 1/20 345/545 |
| 2015/0049105 A1* | 2/2015 | Ju ............ G09G 5/006 345/555 |

FOREIGN PATENT DOCUMENTS

| | | |
|---|---|---|
| CN | 102542969 | 7/2012 |
| CN | 101980105 | 8/2012 |
| CN | 103443843 | 12/2013 |
| TW | 525115 | 3/2003 |
| TW | 200502914 | 1/2005 |
| TW | 201108177 | 3/2011 |
| TW | 201227658 | 7/2012 |
| TW | 201248603 | 12/2012 |

OTHER PUBLICATIONS

"Office Action of China Counterpart Application", dated Mar. 13, 2017, p. 1-p. 11, in which the listed references were cited.

* cited by examiner

SOURCE DRIVER, DRIVING CIRCUIT AND DISPLAY APPARATUS

CROSS-REFERENCE TO RELATED APPLICATION

This application claims the priority benefits of U.S. provisional application Ser. No. 61/989,477, filed on May 6, 2014 and Taiwan application serial no. 103131185, filed on Sep. 10, 2014. The entirety of each of the above-mentioned patent applications is hereby incorporated by reference herein and made a part of this specification.

BACKGROUND OF THE INVENTION

Field of the Invention

The invention relates to a driver, and more particularly, relates to a source driver, a driving circuit and a display apparatus.

Description of Related Art

In present days, multi-media technologies have become quite well-developed owing to the advancement of semiconductor devices or display apparatuses. Among the display apparatuses, a liquid crystal display (LCD) gradually becomes mainstream products in the market owing to superior characteristics of high definition, great space utilization, low power consumption, and non-radiation. In traditional driving methods, a data transmission rate of the liquid crystal display will rapidly increase when displaying in high quality and high frame rate to thereby cause various problems, such as transmission speed of a chip becoming higher, speed in image processing becoming higher, increases in power consumption of the display apparatus, difficulties in passing system safety certification and increases in hardware costs. Accordingly, it is an important issue in designing the display apparatus as how to reduce a transmission amount of image data in the display apparatus without affecting image quality or within an acceptable range.

SUMMARY OF THE INVENTION

The invention is directed to a source driver, a driving circuit and a display apparatus, which are capable of reducing a data transmission rate between the timing controller and the source driver in order to avoid the problems caused by high data transmission rate.

A source driver of the invention includes a decompressor, a plurality of data latch units and a digital-to-analog converter. The decompressor receives compressed image data and performs a decompression on the compressed image data in order to provide restored image data. The restored image data includes a plurality of display data. The data latch units are configured to latch the display data and sequentially provide the display data. The digital-to-analog converter is configured to sequentially receive the display data in order to convert the display data from a digital format into an analog format, so as to sequentially generate a plurality of analog output signals.

In an embodiment of the invention, each of the compressed image data includes the display data of a plurality of lines, and the decompressor simultaneously obtains the display data of the plurality of lines after performing the decompression on the compressed image data.

In an embodiment of the invention, a compressing unit of the compressed image data is N pixel*M pixel. N pixel*M pixel represents a M number of pixels among a N number of lines, and N and M are positive integers.

In an embodiment of the invention, a total of the data latch units is 2+P, in which P is a positive integer, and P=N.

In an embodiment of the invention, a total of the data latch units is 2+P, in which P is a positive integer, and P<N.

In an embodiment of the invention, N=2 and M=2.

In an embodiment of the invention, N=1 and M=4.

In an embodiment of the invention, a total of the data latch units is 3. Further, the data latch units include a first latch unit, a second latch unit and a third latch unit. The display data of each of the lines among the display data is temporarily stored into one of the first latch unit and the third latch unit or temporarily stored into both of the first latch unit and the third latch unit after dividing the display data, and then provided to the second latch unit by the first latch unit and the third latch unit.

In an embodiment of the invention, the first latch unit sequentially and temporarily stores the display data of a first line among the display data and a front section, a rear section or a whole section of each one of the display data of a plurality of subsequent lines among the display data. The second latch unit sequentially and temporarily stores a whole section of the display data of each of the lines. The third latch unit sequentially and temporarily stores the display data of a second line among the display data and a front section, a rear section or a whole section of each one of the display data of the subsequent lines among the display data.

In an embodiment of the invention, a total of the data latch units is 4. Further, the data latch units include a first latch unit, a second latch unit, a third latch unit and a fourth latch unit. The display data of each of the lines among the display data is temporarily stored into one of the first latch unit and the fourth latch unit and then provided to the third latch unit by the fourth latch unit and further provided to the second latch unit by the first latch unit and the third latch unit.

In an embodiment of the invention, the first latch unit sequentially stores the display data of odd-number lines among the display data. The second latch unit sequentially stores the display data of each of the lines among the display data. The third latch unit sequentially and intermittently stores the display data of even-number lines among the display data. The fourth latch unit sequentially stores the display data of the even-number lines among the display data.

In an embodiment of the invention, the source driver further includes a charge sharing control circuit, which is coupled to the decompressor, and configured to determine whether to active a charge sharing among a plurality of data channels according to the display data of the plurality of lines.

In an embodiment of the invention, the source driver further includes a receiver, which is configured to receive a compressed image signal in order to provide the compressed image data.

In an embodiment of the invention, the source driver further includes a memory unit, which is coupled between the receiver and the decompressor.

In an embodiment of the invention, the source driver further includes a bus remapping unit, which is coupled between the decompressor and the data latch units, and configured to assign the display data to the data latch units.

In an embodiment of the invention, the source driver further includes an output buffer, which is coupled to the digital-to-analog converter in order to generate a plurality of source driving signals according to the analog output signals.

A driving circuit of the invention is configured to drive a display panel, and includes a timing controller and a source driver. The timing controller is configured to provide a compressed image signal. The source driver is configured to receive the compressed image signal, and has a decompressor configured to convert the compressed image signal into restored image data and sequentially provide a plurality of source driving signals according to a plurality of display data of the restored image data.

A display apparatus of the invention includes a display panel, a timing controller and a source driver. The timing controller is configured to receive an external image signal to provide a compressed image signal. The source driver is configured to receive the compressed image signal, and has a decompressor configured to convert the compressed image signal into restored image data and provide a plurality of source driving signals to drive the display panel according to a plurality of display data of the restored image data.

In an embodiment of the invention, the timing controller receives an external image signal from the outside, and the external image signal is compressed.

In an embodiment of the invention, the source driver further includes a host, and the host compresses an image signal in order to provide the external image signal which is compressed.

In an embodiment of the invention, the timing controller includes a compressor, which is configured to compress an external image signal in order to form the compressed image signal.

In an embodiment of the invention, the timing controller further includes a memory unit, which is coupled between the compressor and the source driver, and configured to store the compressed image signal.

In an embodiment of the invention, the source driver further includes a memory unit, which is coupled between the timing controller and the decompressor, and configured to store the compressed image signal.

Based on the above, in the source driver, the driving circuit and the display apparatus according to the embodiments of the invention, because a data transmission is performed between the timing controller and the source driver through the compressed image signal which is compressed, a data transmission rate between the timing controller and the source driver can be reduced in order to avoid the problems caused by high data transmission rate.

To make the above features and advantages of the disclosure more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
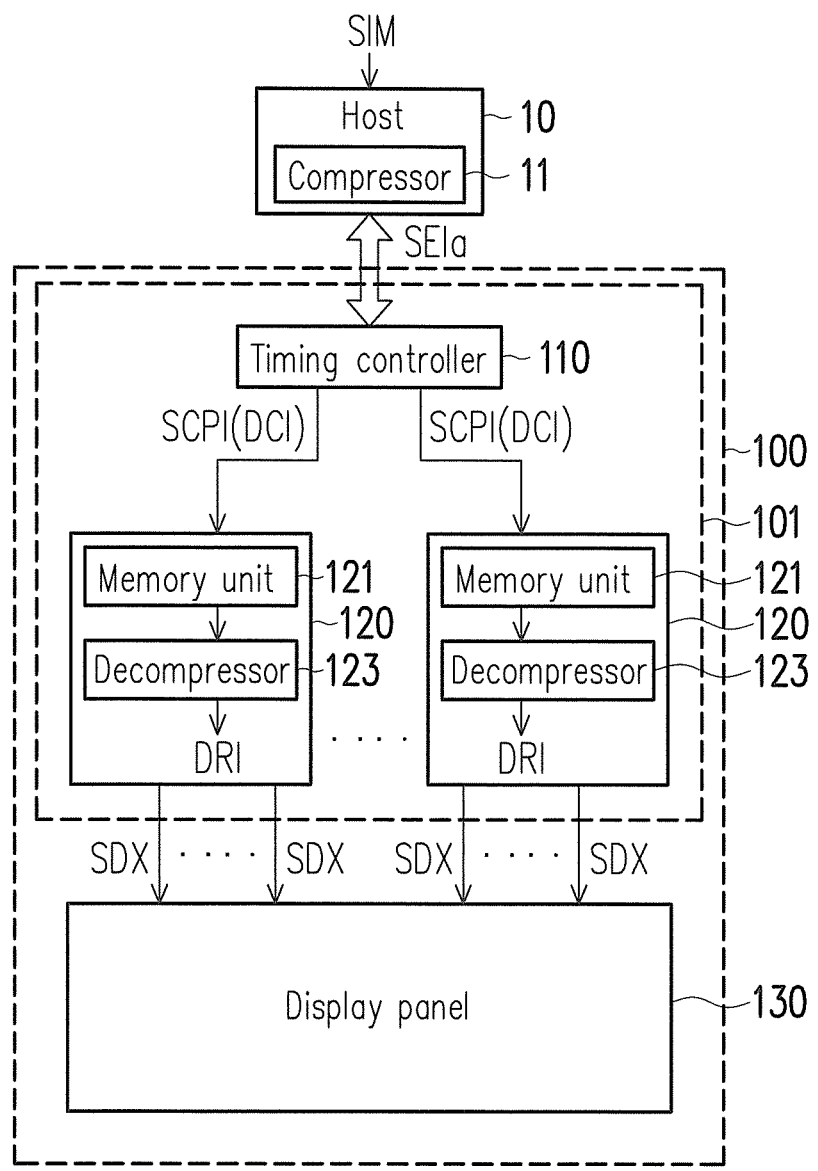
FIG. 1 is a system schematic diagram of a display apparatus according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a system schematic diagram of a display apparatus according to an embodiment of the invention. Referring to FIG. 1, in the present embodiment, a display apparatus 100 receives an external image signal SEIa provided by a host 10 from the outside, and includes a display panel 130 and a driving circuit 101 configured to drive the display panel 130. Among them, the host 10 includes, for example, a compressor 11. That is, the host 10 is capable of compressing an image signal SIM in order to provide the external image signal SEIa which is compressed. Further, in the present embodiment, the driving circuit 101 includes, for example, a timing controller 110 and a plurality of source drivers 120. However, in other embodiments, the driving circuit 101 may further include a gate driver (not illustrated), but the embodiment of the invention is not limited thereto.

In the present embodiment, after receiving the compressed external image signal SEIa, the timing controller 110 can directly output the compressed external image signal SEIa to serve as a compressed image signal SCPI. A source driver 120 is configured to receive the compressed image signal SCPI and has a memory unit 121 and a decompressor 123. The memory unit 121 is coupled between the timing controller 110 and the decompressor 123, and configured to store the compressed image signal SCPI. After accessing the compressed image signal SCPI from the memory unit 121, the decompressor 123 decompresses the compressed image signal SCPI to be converted into restored image data DRI. At this time, the source driver 120 provides a plurality of source driving signals SDX to drive the display panel 130 according to a plurality of display data of the restored image data DRI.

Based on the above, because data transmission are transmitted between the timing controller 110 and the source driver 120 through the compressed image signal SCPI which is compressed, a data transmission rate between the timing controller 110 and the source driver 120 can drop with increases in a data compression rate, so as to avoid the problems caused by high data transmission rate.

In the present embodiment, the compressor 11 and the decompressor 123 are corresponding to the same compression method. More specifically, it is assumed that each of compressed image data DCI of the compressed image signal SCPI includes the display data of a plurality of horizontal lines. Accordingly, the decompressor 123 simultaneously obtains the display data of a plurality of lines after performing a decompression on the compressed image data. In an embodiment of the invention, a compressing unit of the compressed image data DCI may be N pixel*M pixel. N pixel*M pixel represents a M number of pixels among a N number of lines, and N and M are positive integers. For instance, the compressing unit of the compressed image data DCI may be 1 pixel*4 pixel or 2 pixel*2 pixel, which can be adjusted by persons skilled in the art, and the invention in not limited to the above.

Further, in the present embodiment, a host 10 is set outside the display apparatus 100 for example. However, in other embodiments, the host 10 may also be set inside the display apparatus 100, which can be decided by persons skilled in the art, and the invention in not limited to the above.

Figure 2A:
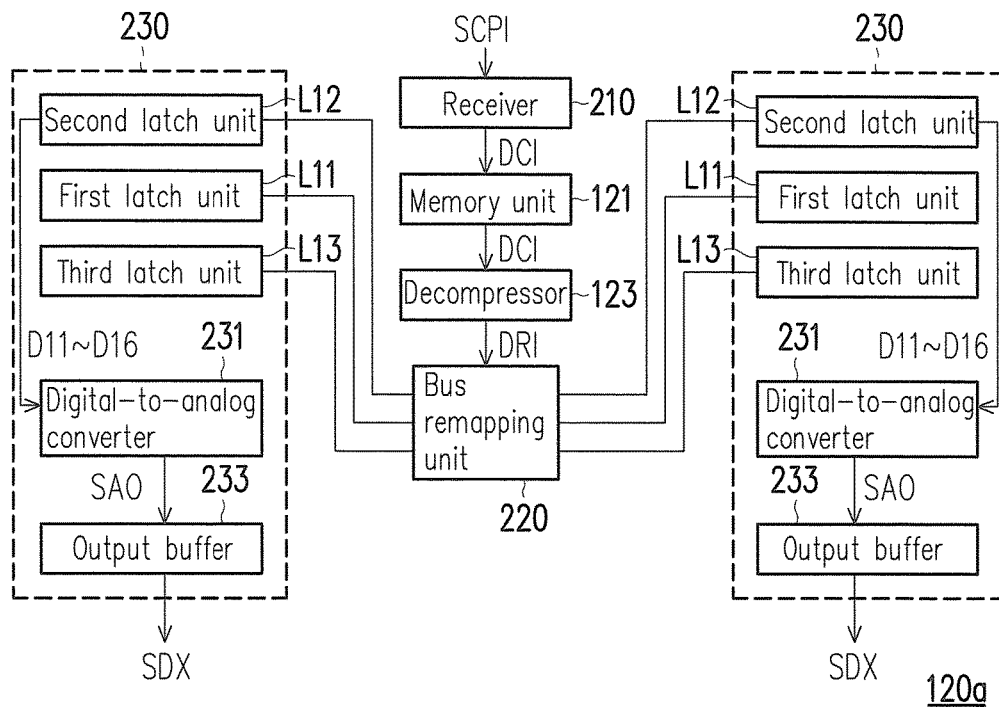
FIG. 2A is a system schematic diagram of a source driver according to an embodiment of the invention.

FIG. 2A is a system schematic diagram of a source driver according to an embodiment of the invention. Referring to FIG. 1 and FIG. 2A, the same or similar elements therein are indicated by the same or similar reference numbers. In the present embodiment, a source driver 120a includes, for example, a receiver 210, the memory unit 121, the decompressor 123, a bus remapping unit 220 and a plurality of data channels 230. The data channel 230 has a plurality of data latch units (e.g., a first latch unit L11, a second latch unit L12 and a third latch unit L13), a digital-to-analog converter 231 and an output buffer 233. Further, in the present embodiment, it is assumed that the compressing unit of the compressed image data DCI is 2 pixel*2 pixel, and thus a total of the data latch units in the data channel 230 may be set to three (i.e., the first latch unit L11, the second latch unit L12 and the third latch unit L13). That is, in addition to two data latch units which are regularly disposed, one (which is corresponding to two horizontal lines minus one horizontal line) data latch unit is further added to store the display data (e.g., D11 to D16) from the decompression.

The receiver 210 is configured to receive the compressed image signal SCPI in order to provide the compressed image data DCI. The memory unit 121 is coupled between the receiver 210 and the decompressor 123, and configured to store the compressed image data DCI of the compressed image signal SCPI. After receiving the compressed image data DCI from the memory unit 121, the decompressor 123 performs the decompression on the compressed image data DCI in order to provide the restored image data DRI. The restored image data DRI includes a plurality of display data (e.g., D11 to D16). The bus remapping unit 220 is coupled between the decompressor 123 and the first latch unit L11, the second latch unit L12 and the third latch unit L13, and configured to assign the display data (e.g., D11 to D16) to the first latch unit L11, the second latch unit L12 and the third latch unit L13.

After sequentially receiving the corresponding display data (e.g., D11 to D16) through the first latch unit L11, the second latch unit L12 and the third latch unit L13, the digital-to-analog converter 231 converts the display data (e.g., D11 to D16) from a digital format into an analog format, so as to sequentially generate a plurality of analog output signals SAO. The output buffer 233 is coupled to the digital-to-analog converter 231 in order to generate the source driving signals SDX according to the analog output signals SAO.

Figure 2B:
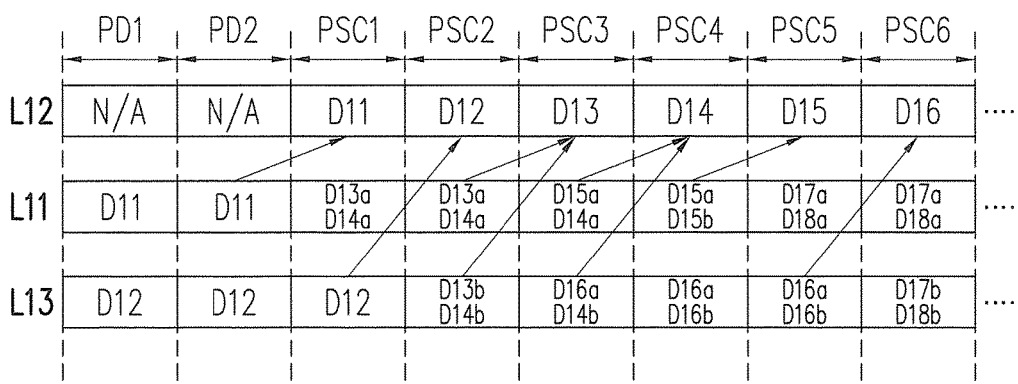
FIG. 2B is a data latch schematic diagram of a data latch unit according to an embodiment of the invention.

FIG. 2B is a data latch schematic diagram of a data latch unit according to an embodiment of the invention. Referring to FIG. 2A and FIG. 2B, because the compressing unit of the compressed image data DCI is 2 pixel*2 pixel and thus the data transmission rate is correspondingly set to a half of what it was, one entire compressed image data DCI will require two horizontal scan periods (e.g., PD1, PD2 and PSC1 to PSC6) to transmit.

More specifically, in preparatory horizontal scan periods PD1 to PD2, the display data D11 and D12 of first and second lines are stored into the first latch unit L11 and the third latch unit L13, respectively, while the second latch unit L12 remains blank (i.e., N/A). In a first horizontal scan period PSC1, the display data D11 is transferred from the first latch unit L11 to the second latch unit L12, so as to transmit the display data D11 to the digital-to-analog converter 231 through the second latch unit L12. At this time, the first latch unit L11 is blank, yet the third latch unit L13 is still stored with the display data D12 pending for displaying and cannot be used.

Because only a half of the compressed image data DCI can be transmitted in one horizontal scan period, only first half portions of the display data D13 and D14 (indicated by D13a and D14a) of third and fourth lines can be obtained in the horizontal scan period PSC1. Further, in order to operate the decompressor 123 normally, the display data D13a and D14a are stored into the first latch unit L11. Similarly, in a second horizontal scan period PSC2, the display data D12 is transferred from the third latch unit L13 to the second latch unit L12, and second half portions of the display data D13 and D14 (indicated by D13b and D14b) outputted by the decompressor 123 are stored into the third latch unit L13.

In a third horizontal scan period PSC3, the display data D13 is transferred from the first latch unit L11 and the third latch unit L13 to the second latch unit L12, and first half portions of the display data D15 and D16 (indicated by D15a and D16a) of fifth and sixth lines are stored into the blank positions of the first latch unit L11 and the third latch unit L13, respectively. In a fourth horizontal scan period PSC4, the display data D14 is transferred from the first latch unit L11 and the third latch unit L13 to the second latch unit L12, and second half portions of the display data D15 and D16 (indicated by D15b and D16b) of fifth and sixth lines are stored into the blank positions of the first latch unit L11 and the third latch unit L13, respectively. At this time, the first latch unit L11 is considered as being stored with the entire display data D15, and the third latch unit L13 is considered as being stored with the entire display data D16. Actions regarding subsequent horizontal scan periods (e.g., PSC5 and PSC6) may refer to the actions in the first to the fourth horizontal scan periods, so that the other display data (e.g., D17 and D18) can be stored by the first latch unit L11 and the third latch unit L13 and then transmitted to the second latch unit L12.

Based on the above, the display data (e.g., D11 to D16) of each of the lines is temporarily stored into one of the first latch unit L11 and the third latch unit L13 or temporarily stored into both of the first latch unit L11 and the third latch unit L13 after dividing the display data, and then provided to the second latch unit L12 by the first latch unit L11 and the third latch unit L13. More specifically, the first latch unit L11 sequentially and temporarily stores the display data D11 of a first line among the display data (e.g., D12 to D16) and a front section, a rear section or a whole section of each one of the display data (e.g., D12 to D16) of a plurality of subsequent lines; the second latch unit L12 sequentially and temporarily stores a whole section of the display data (e.g., D12 to D16) of each of the lines; and the third latch unit L13 sequentially and temporarily stores the display data D12 of a second line among the display data (e.g., D11 to D16) and a front section, a rear section or a whole section of each one of the display data of the subsequent lines (e.g., D13 to D16) among the display data.

Figure 3A:
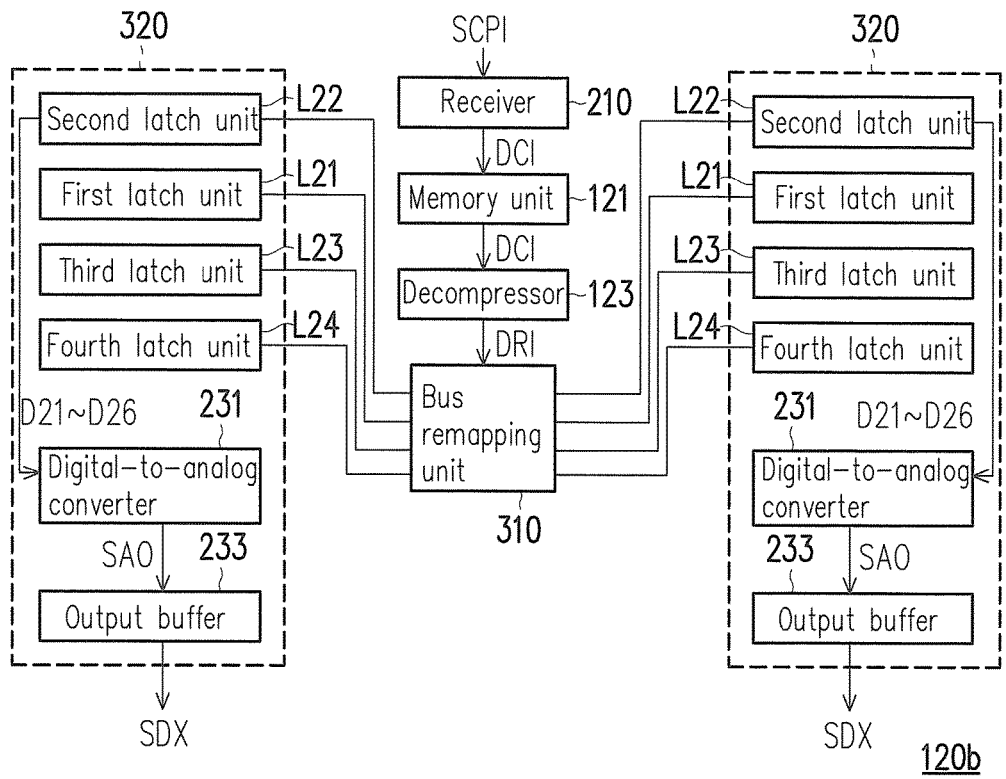
FIG. 3A is a system schematic diagram of a source driver according to another embodiment of the invention.

FIG. 3A is a system schematic diagram of a source driver according to another embodiment of the invention. Referring to FIG. 2A and FIG. 3A, the same or similar elements therein are indicated by the same or similar reference numbers. In the present embodiment, a source driver 120b is approximately identical to the source driver 120a, and a difference between the two is that each of data channels 320 has four data latch units (i.e., a first latch unit L21, a second latch unit L22, a third latch unit L23 and a fourth latch unit L24), and assigns display data (e.g., D21 to D28) through a bus remapping unit 310 to the first latch unit L21, the second latch unit L22, the third latch unit L23 and the fourth latch unit L24. Herein, in the present embodiment, it is still assumed that the compressing unit of the compressed image data DCI is 2 pixel*2 pixel, while a total of the data latch units in the data channel 320 is set to four. That is, in addition to two data latch units which are regularly disposed, two data latch units are further added to store the display data (e.g., D21 to D28) from the decompression.

Figure 3B:
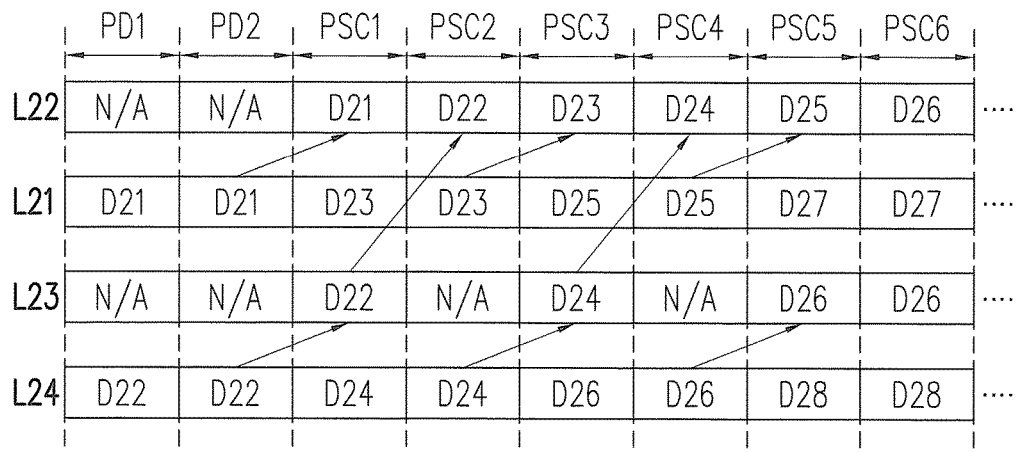
FIG. 3B is a data latch schematic diagram of a data latch unit according to another embodiment of the invention.

FIG. 3B is a data latch schematic diagram of a data latch unit according to another embodiment of the invention. Referring to FIG. 3A and FIG. 3B, because the compressing unit of the compressed image data DCI is 2 pixel*2 pixel and thus the data transmission rate is correspondingly set to a half of what it was, one entire compressed image data DCI will require two horizontal scan periods (e.g., PD1, PD2 and PSC1 to PSC6) to transmit.

More specifically, in preparatory horizontal scan periods PD1 to PD2, the display data D21 and D22 of first and second lines are stored into the first latch unit L21 and the fourth latch unit L24, respectively, while the second latch unit L22 and the third latch unit L23 remain blank (i.e., N/A). In a first horizontal scan period PSC1, the display data D21 is transferred from the first latch unit L21 to the second latch unit L22, so as to transmit the display data D21 to the digital-to-analog converter 231 through the second latch unit L22. Further, the display data D22 is transferred from the fourth latch unit L24 to the third latch unit L23. At this time, the first latch unit L21 and the fourth latch unit L24 are cleared for storing the next compressed image data DCI (i.e., the display data D23 and D24 of third and fourth lines)

In a second horizontal scan period PSC2, the display data D22 is transferred from the third latch unit L23 to the second latch unit L22, while the first latch unit L21 and the fourth latch unit L24 are still stored with the display data D23 and D24. Actions regarding subsequent horizontal scan periods (e.g., PSC4 to PSC6) may refer to the actions in the first and the second horizontal scan periods, so that the other display data (e.g., D25 and D28) can be stored by the first latch unit L21, the third latch unit L23 and the fourth latch unit L24 and then transmitted to the second latch unit L22.

Based on the above, the display data (D21 to D26) of each of the lines among the display data is temporarily stored into one of the first latch unit L21 and the fourth latch unit L24, then provided to the third latch unit L23 by the fourth latch unit L24, and then provided to the second latch unit L22 by the first latch unit L21 and the third latch unit L23. More specifically, the first latch unit L21 sequentially stores the display data of odd-number lines (e.g., D21, D23, D25) among the display data (e.g., D21 to D26), the second latch unit L22 sequentially stores the display data of each of the lines among the display data (D21 to D26), the third latch unit L23 sequentially and intermittently stores the display data of even-number lines (e.g., D22, D24, D26) among the display data (e.g., D21 to D26), and the fourth latch unit L24 sequentially stores the display data of the even-number lines (e.g., D22, D24, D26) among the display data (e.g., D21 to D26).

Figure 4:
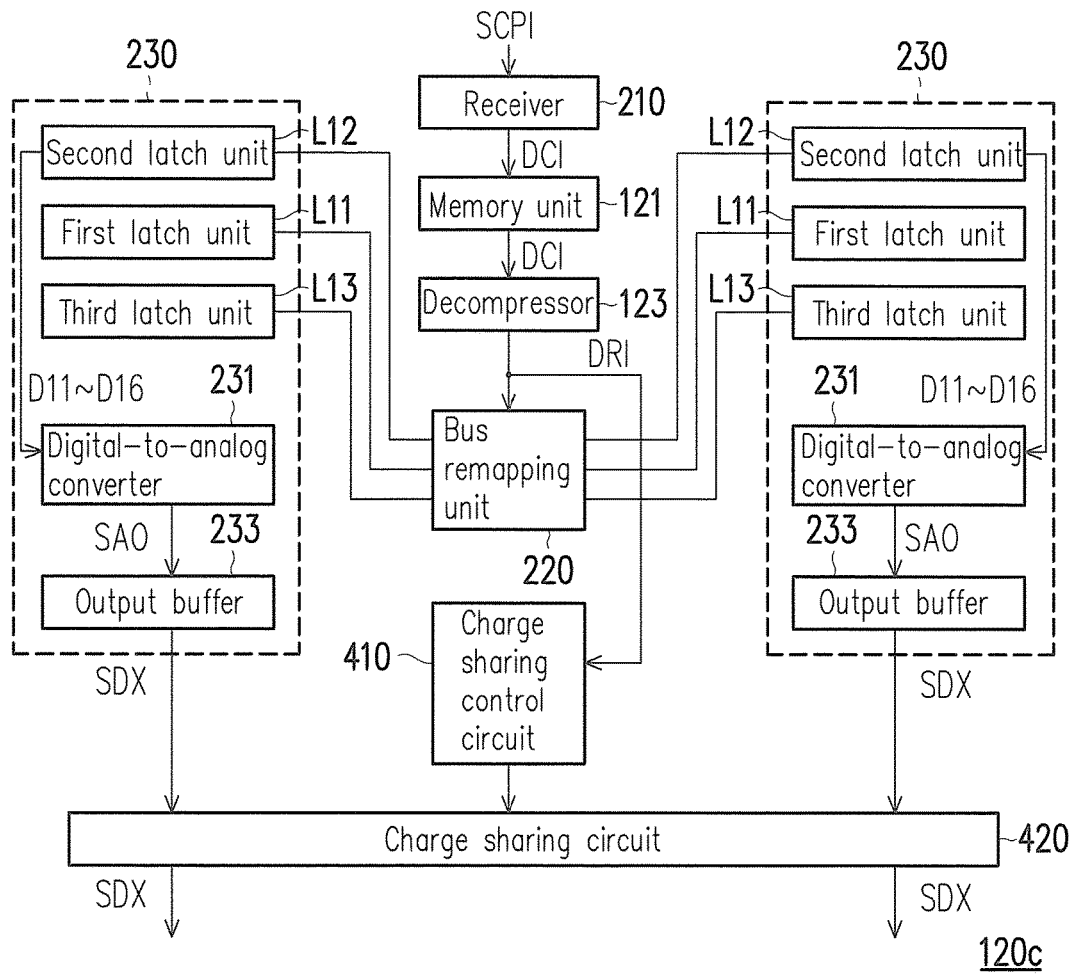
FIG. 4 is a system schematic diagram of a source driver according to yet another embodiment of the invention.

FIG. 4 is a system schematic diagram of a source driver according to yet another embodiment of the invention. Referring to FIG. 2A and FIG. 4, the same or similar elements therein are indicated by the same or similar reference numbers. In the present embodiment, a source driver 120c is approximately identical to the source driver 120a, and a difference between the two is that the source driver 120c further includes a charge sharing control circuit 410 and a charge sharing circuit 420. The charge sharing circuit 420 is coupled to an output terminal of all the data channels 230 to execute a charge sharing among all the data channels 230 under control of the charge sharing control circuit 410. The charge sharing circuit 420 is coupled to the decompressor 123 and the charge sharing circuit 420 to receive the display data (e.g., D11 to D16) of a plurality of lines contained in the restored image data DRI, and determine whether to execute the charge sharing among all the data channels 230 according to the received display data (e.g., D11 to D16).

Figure 5:
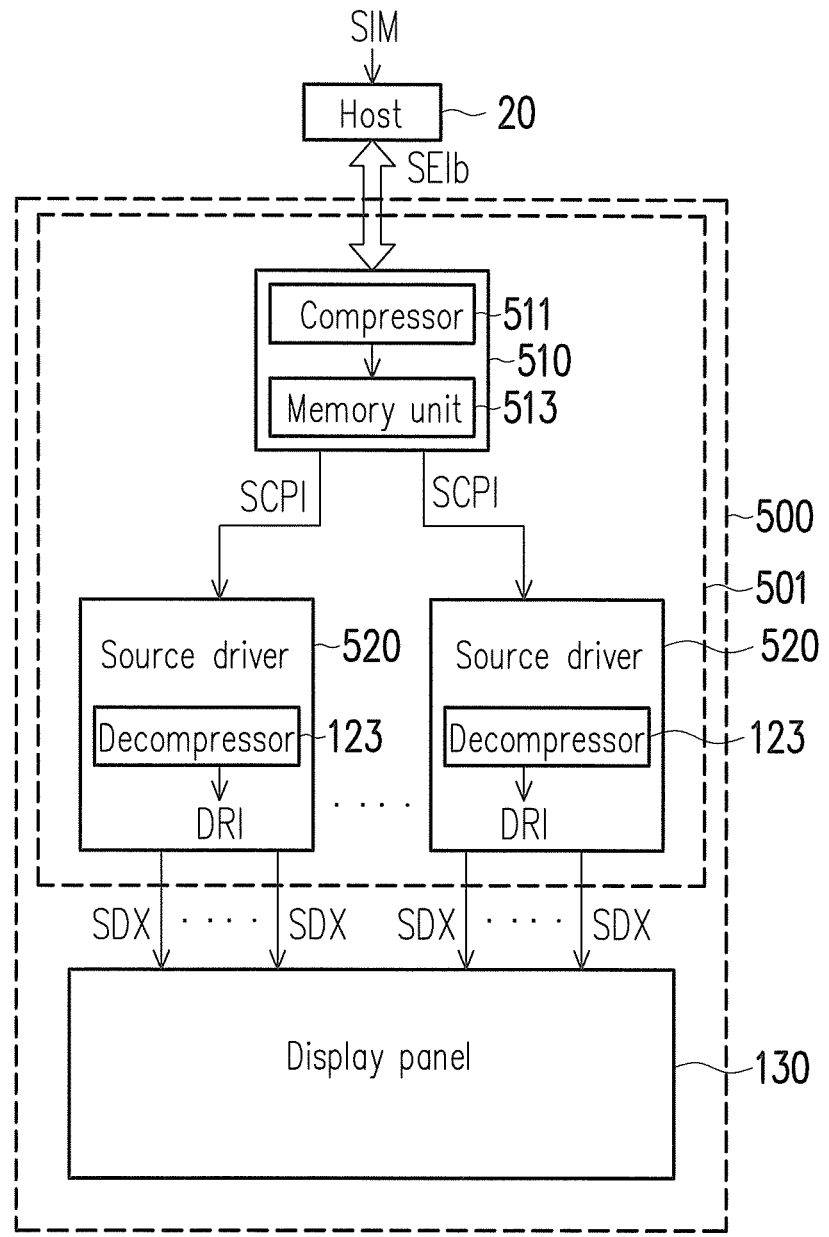
FIG. 5 is a system schematic diagram of a display apparatus according to another embodiment of the invention.

FIG. 5 is a system schematic diagram of a display apparatus according to another embodiment of the invention. Referring to FIG. 1 and FIG. 5, the same or similar elements therein are indicated by the same or similar reference numbers. In the present embodiment, a display apparatus 500 is approximately identical to the display apparatus 100, and a difference between the two is a driving circuit 501. The driving circuit 501 includes, for example, a timing controller 510 and a plurality of source drivers 520. In the present embodiment, a host 20 directly transmits an image signal SIM (i.e., providing an external image signal SEIb which is not yet compressed).

The timing controller 510 includes a compressor 511 and a memory unit 513. The compressor 511 is configured to compress the external image signal SEIb to from the compressed image signal SCPI. The memory unit 513 is coupled between the compressor 511 and the source drivers 520, and configured to store the compressed image signal SCPI. In other words, after receiving the external image signal SEIb which is not yet compressed, the compressor 511 compresses the external image signal SEIb to form the compressed image signal SCPI to be transmitted to the source drivers 520 through the memory unit 513. Further, the source driver 520 of the invention has the decompressor 123 configured to decompress the compressed image signal SCPI to be converted into the restored image data DRI. At this time, the source driver 520 still can provide a plurality of source driving signals SDX to drive the display panel 130 according to a plurality of display data the restored image data DRI.

Figure 6:
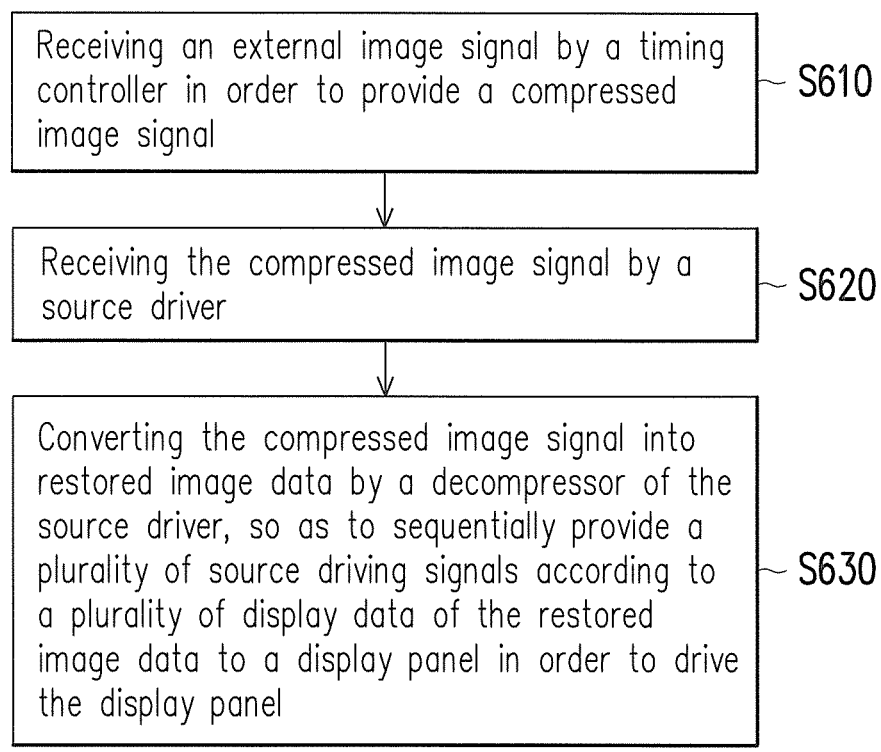
FIG. 6 is a flowchart of an operation method of an display apparatus according to an embodiment of the invention.

FIG. 6 is a flowchart of an operation method of an display apparatus according to an embodiment of the invention. Referring to FIG. 6, in the present embodiment, the operation method of the display apparatus includes the following steps. First of all, an external image signal is received by a timing controller in order to provide a compressed image signal (step S610). Subsequently, the compressed image signal is received by a source driver (step S620). Also, the compressed image signal is converted into restored image data by a decompressor of the source driver, so as to sequentially provide a plurality of source driving signals according to a plurality of display data of the restored image data to a display panel in order to drive the display panel (step S630). A sequence of steps S610, S620 and S630 is merely an example, and the embodiments of the invention are not limited thereto. Further, details regarding steps S610, S620 and S630 may refer to the embodiments of FIG. 1, FIG. 2A, FIG. 2B, FIG. 3A, FIG. 3B, FIG. 4, FIG. 5 and FIG. 6, and thus related descriptions are not repeated hereinafter.

In summary, in the source driver, the driving circuit and the display apparatus according to the embodiments of the invention, because the data is transmitted between the timing controller and the source driver through the compressed image signal which is compressed, the data transmission rate between the timing controller and the source driver can be reduced in order to avoid the problems caused by high data transmission rate. Also, an amount of data latch units used in the data channel can be reduced by alternately storing the data. Furthermore, because the restored image data includes the display data of the plurality of lines, each one of the restored image data can be used to determine whether to execute the charge sharing among the data channels, so as to reduce power consumption of the source driver.

Although the present invention has been described with reference to the above embodiments, it will be apparent to one of ordinary skill in the art that modifications to the described embodiments may be made without departing from the spirit of the invention. Accordingly, the scope of the invention will be defined by the attached claims and not by the above detailed descriptions.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A source driver, comprising:
    a decompressor, receiving a compressed image data and performing a decompression on the compressed image data in order to provide a restored image data, wherein the restored image data comprises a plurality of display data;
    a plurality of data latch units, configured to latch the display data and sequentially provide the display data; and
    a digital-to-analog converter, configured to sequentially receive the display data in order to convert the display data from a digital format into an analog format, so as to sequentially generate a plurality of analog output signals,
    wherein the data latch units comprise a first latch unit, a second latch unit and a third latch unit, and the display data of each of the lines among the display data is temporarily stored into one of the first latch unit and the third latch unit or temporarily stored into both of the first latch unit and the third latch unit after dividing the display data and then provided to the second latch unit by at least one the first latch unit and the third latch unit.

2. The source driver of claim 1, wherein each of the compressed image data comprises the display data of a plurality of lines, and the decompressor simultaneously obtains the display data of the plurality of lines after performing the decompression on the compressed image data.

3. The source driver of claim 1, wherein the first latch unit sequentially and temporarily stores the display data of a first line among the display data and a front section, a rear section or a whole section of each one of the display data of a plurality of subsequent lines among the display data, the second latch unit sequentially and temporarily stores a whole section of the display data of each of the lines, and the third latch unit sequentially and temporarily stores the display data of a second line among the display data and a front section, a rear section or a whole section of each one of the display data of the subsequent lines among the display data.

4. The source driver of claim 1, further comprising a charge sharing control circuit, coupled to the decompressor, and determining whether to activate a charge sharing among a plurality of data channels according to the display data of the plurality of lines.

5. The source driver of claim 1, further comprising:
    a receiver, configured to receive a compressed image signal in order to provide the compressed image data.

6. The source driver of claim 5, further comprising:
    a memory unit, coupled between the receiver and the decompressor.

7. The source driver of claim 1, further comprising:
    a bus remapping unit, coupled between the decompressor and the data latch units, and configured to assign the display data to the data latch units.

8. The source driver of claim 1, further comprising:
    an output buffer, coupled to the digital-to-analog converter in order to generate a plurality of source driving signals according to the analog output signals.

9. A source driver, comprising:
    a decompressor, receiving a compressed image data and performing a decompression on the compressed image data in order to provide a restored image data, wherein the restored image data comprises a plurality of display data;
    a plurality of data latch units, configured to latch the display data and sequentially provide the display data; and
    a digital-to-analog converter, configured to sequentially receive the display data in order to convert the display data from a digital format into an analog format, so as to sequentially generate a plurality of analog output signals,
    wherein the data latch units comprise a first latch unit, a second latch unit, a third latch unit and a fourth latch unit, and the display data of each of the lines among the display data is temporarily stored into one of the first latch unit and the fourth latch unit and then provided to the third latch unit by the fourth latch unit and further provided to the second latch unit by one of the first latch unit and the third latch unit.

10. The source driver of claim 9, wherein the first latch unit sequentially stores the display data of odd-number lines among the display data, the second latch unit sequentially stores the display data of each of the lines among the display data, the third latch unit sequentially and intermittently stores the display data of even-number lines among the display data, and the fourth latch unit sequentially stores the display data of the even-number lines among the display data.

* * * * *